(12) United States Patent
Jongmans et al.

(10) Patent No.: US 11,937,546 B2
(45) Date of Patent: *Mar. 26, 2024

(54) COMBINE HEADER EQUIPPED WITH AN AUTOMATED HEADER TRANSPORT SYSTEM AND HEADER STEERING MECHANISM

(71) Applicant: CNH Industrial America LLC, New Holland, PA (US)

(72) Inventors: Dré W. J. Jongmans, Klundert (NL); Bart M. A. Missotten, Herent (BE); Kenneth De Ceunynck, Diksmuide (BE); Sam Reubens, Sint-Michiels (BE); Frederik Tallir, Esen (BE); Pieter Van Overschelde, Sint-Andries (BE); Michiel Desmyter, Ledegem (BE)

(73) Assignee: CNH Industrial America LLC, New Holland, PA (US)

( * ) Notice: Subject to any disclaimer, the term of this patent is extended or adjusted under 35 U.S.C. 154(b) by 238 days.

This patent is subject to a terminal disclaimer.

(21) Appl. No.: 17/350,126

(22) Filed: Jun. 17, 2021

(65) Prior Publication Data
US 2021/0307249 A1    Oct. 7, 2021

Related U.S. Application Data

(63) Continuation of application No. PCT/EP2019/085465, filed on Dec. 16, 2019.

(30) Foreign Application Priority Data

Dec. 17, 2018 (EP) ..................... 18213191

(51) Int. Cl.
A01D 41/14 (2006.01)
A01B 73/00 (2006.01)
A01D 75/00 (2006.01)

(52) U.S. Cl.
CPC .......... *A01D 41/141* (2013.01); *A01B 73/005* (2013.01); *A01D 75/002* (2013.01)

(58) Field of Classification Search
CPC ... A01D 41/141; A01D 75/002; A01B 73/005
See application file for complete search history.

(56) References Cited

U.S. PATENT DOCUMENTS 3,211,467 A * 10/1965 Siddall ................... B62D 13/04
280/103
3,683,605 A * 8/1972 Jakobi .................. A01D 75/002
56/228

(Continued)

FOREIGN PATENT DOCUMENTS

DE  39 19 561 A1  12/1990
EP  1 905 293 A1  4/2008

(Continued)

OTHER PUBLICATIONS

Extended European Search Report dated Jun. 25, 2019 for European Patent Application No. 18213191.2 (6 pages).

(Continued)

*Primary Examiner* — Thomas B Will
*Assistant Examiner* — Julia C Tran
(74) *Attorney, Agent, or Firm* — Peter K. Zacharias

(57) ABSTRACT

A header including a front and rear wheel assembly, each assembly having an axle and two wheels. Each wheel assembly is coupled to the main body of the header by an actuating system having an actuator mechanism for actuating a swivel movement of the axle and the wheels to bring the wheel assembly to or from a road transport position. The (Continued)

front and rear wheel assemblies are equipped with tie rod arrangements for steering the header when it is transported on the road. The wheels of the wheel assemblies are operated as caster wheels. The tie rod arrangement of the front wheel assembly is coupled to a pivotable base connected to, or connectable to, a drawbar. The wheel assemblies have respective actuators which are synchronized so as to synchronize the position of the front and rear wheels.

14 Claims, 12 Drawing Sheets

(56) References Cited

U.S. PATENT DOCUMENTS

| | | | | |
|---|---|---|---|---|
| 3,763,637 A * | 10/1973 | Schmitt | ............... | A01D 75/002 56/228 |
| 3,806,160 A * | 4/1974 | Duerksen | ............... | B64F 1/324 140/140 |
| 3,962,853 A * | 6/1976 | Schwalm | ............ | A01D 75/002 56/228 |
| 4,043,099 A * | 8/1977 | Cheatum | ............. | A01D 67/005 56/11.9 |
| 4,371,299 A * | 2/1983 | Cain | .................... | A01B 73/005 410/44 |
| 4,558,560 A * | 12/1985 | Koch | .................. | A01D 75/002 56/192 |
| 4,986,064 A * | 1/1991 | Ermacora | ............ | A01B 73/005 280/415.1 |
| 5,529,447 A | 6/1996 | Bruns et al. | | |
| 7,197,865 B1 * | 4/2007 | Enns | ....................... | A01D 41/14 56/228 |
| 7,874,571 B2 * | 1/2011 | Frey | ......................... | B60G 3/14 280/445 |
| 7,926,249 B1 * | 4/2011 | Cook | .................... | A01B 73/005 172/240 |
| 7,926,833 B2 * | 4/2011 | Hellbusch | .............. | B62D 13/02 280/91.1 |
| 8,025,312 B1 * | 9/2011 | Honas | .................. | A01D 75/002 56/228 |
| 9,840,277 B1 | 12/2017 | Beech | | |
| 2003/0201135 A1 * | 10/2003 | Jaberg | .................... | B62D 7/144 180/417 |
| 2004/0016589 A1 * | 1/2004 | Ulschmid | ............ | B62D 7/1527 180/408 |
| 2008/0086999 A1 * | 4/2008 | Tippery | ............... | A01D 75/002 56/14.4 |
| 2012/0217723 A1 * | 8/2012 | Smith | .................... | B62D 13/04 56/228 |
| 2015/0091274 A1 | 4/2015 | Bojsen | | |
| 2017/0359942 A1 * | 12/2017 | Peterson | .............. | A01B 63/006 |
| 2018/0310462 A1 * | 11/2018 | Chen | ...................... | A01D 41/06 |
| 2020/0008341 A1 * | 1/2020 | Madarasi | ................. | B25J 5/007 |
| 2020/0055545 A1 * | 2/2020 | Chen | .................... | A01B 73/005 |

FOREIGN PATENT DOCUMENTS

| | | |
|---|---|---|
| EP | 3 175 691 A1 | 6/2017 |
| FR | 3 008 276 A1 | 1/2015 |
| FR | 3 032 856 A1 | 8/2016 |

OTHER PUBLICATIONS

Notification of Transmittal of the International Search Report and the Written Opinion of the International Searching Authority, or the Declaration dated Mar. 25, 2020 for International Application No. PCT/EP2019/085465 (12 pages).

* cited by examiner

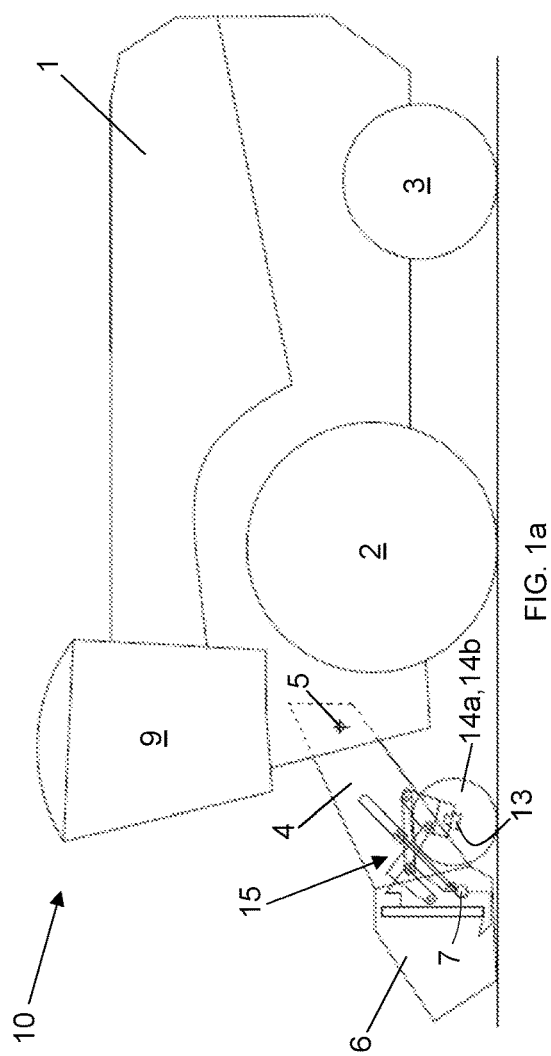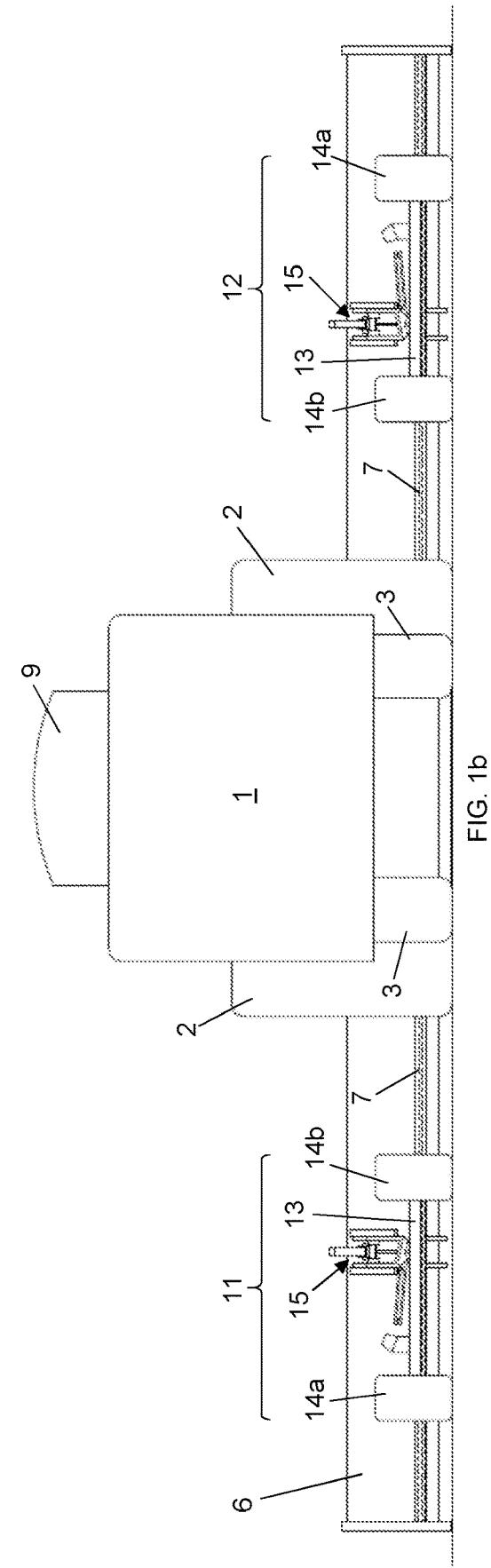

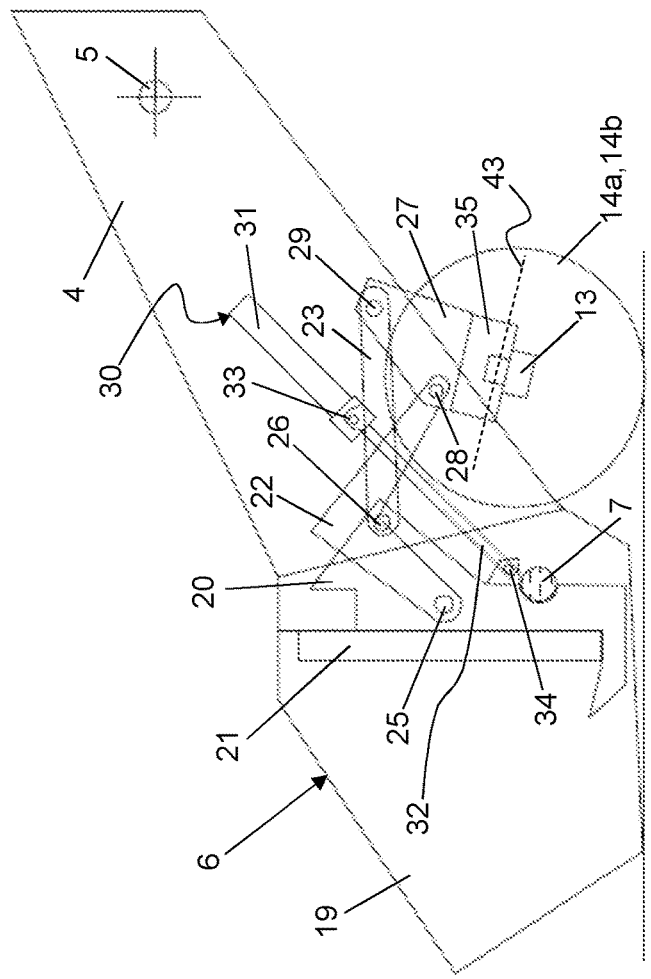

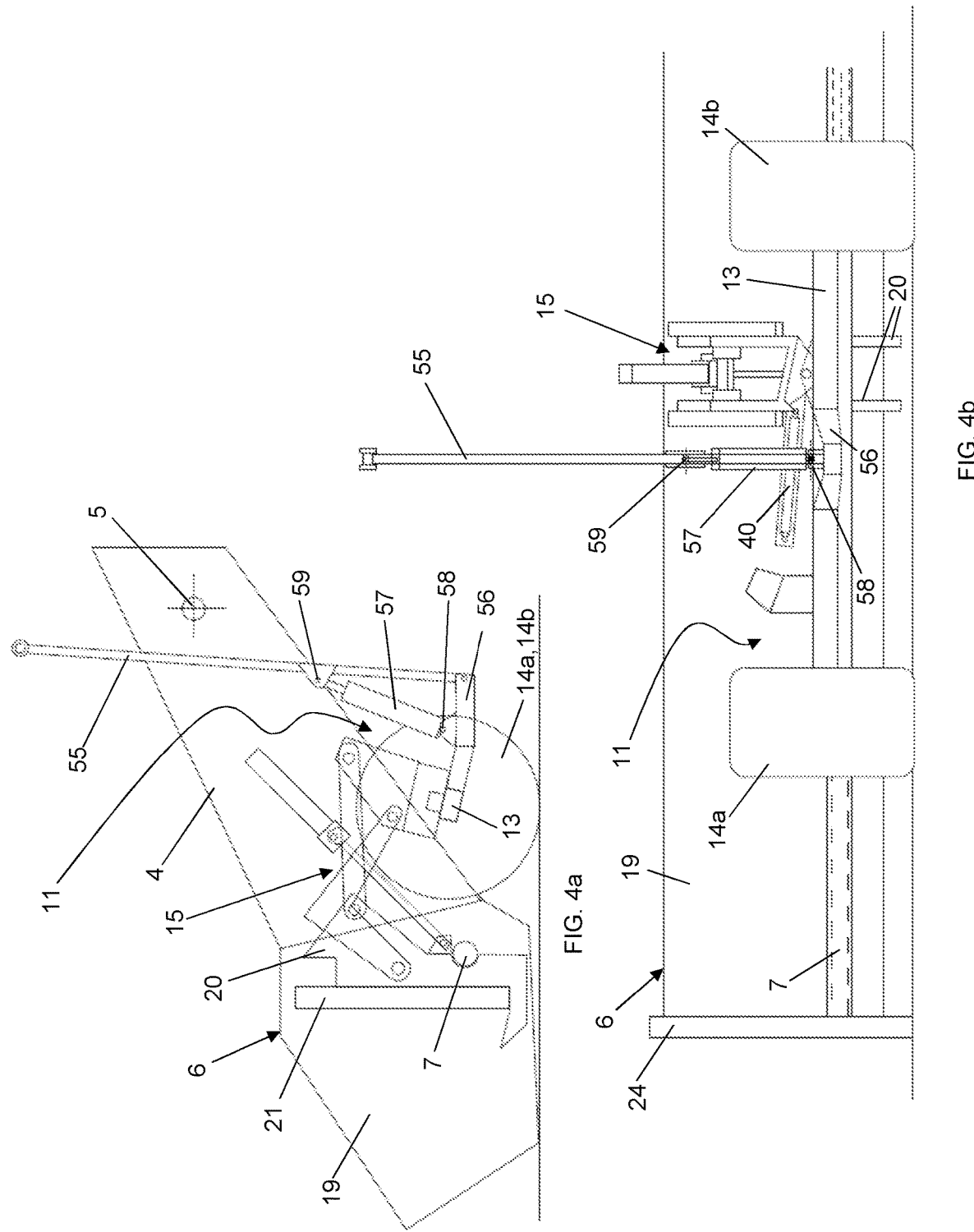

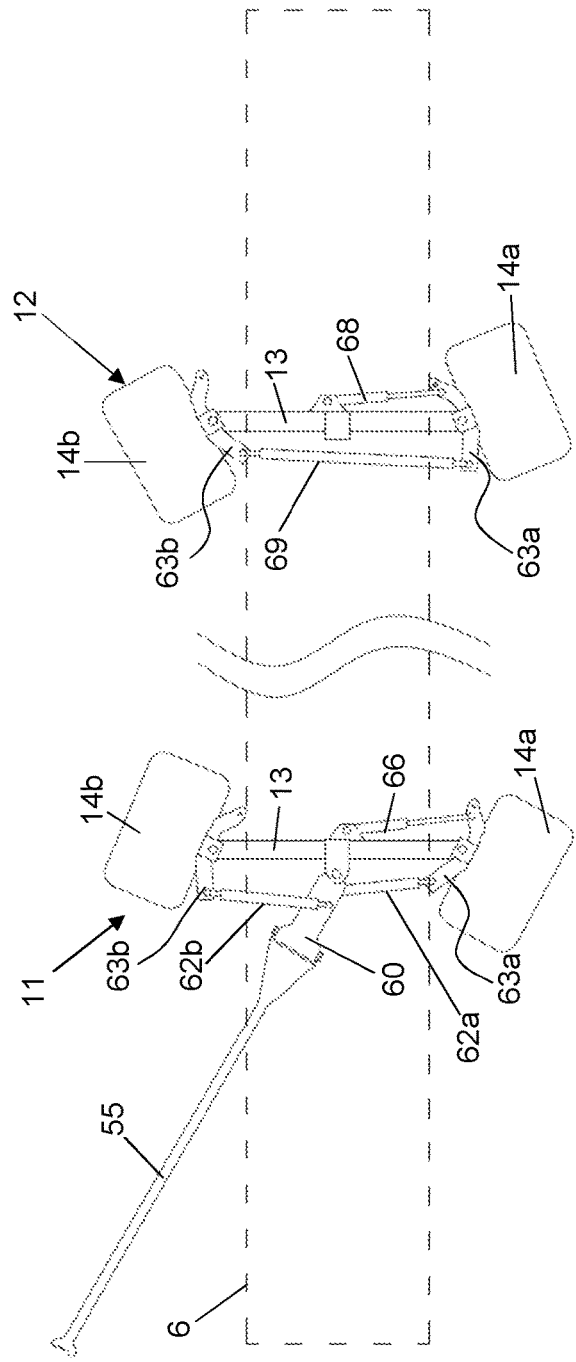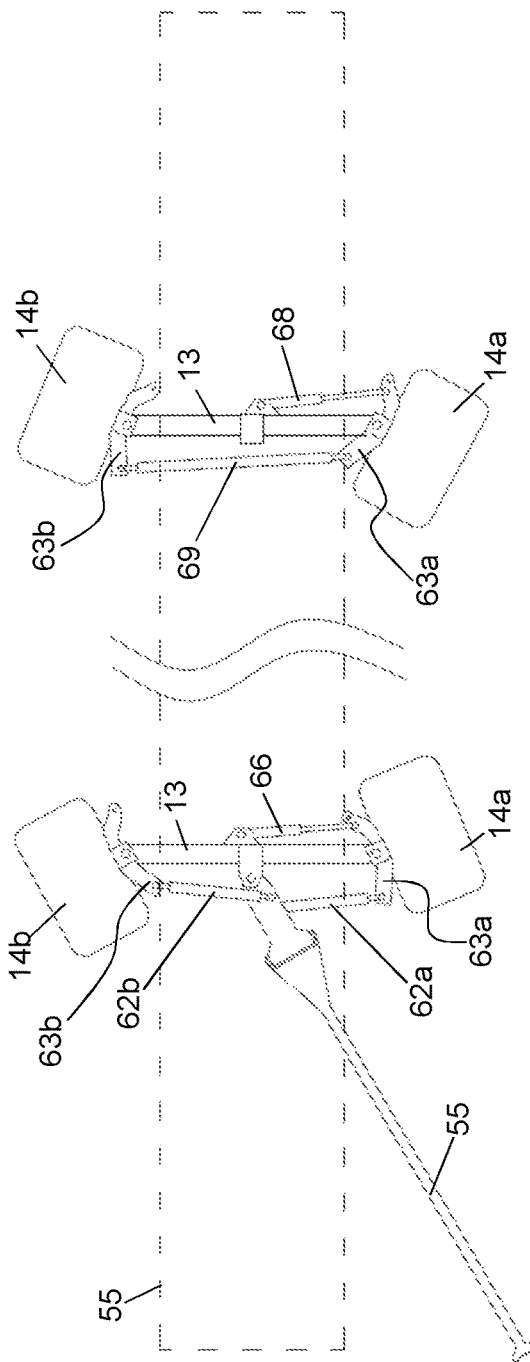

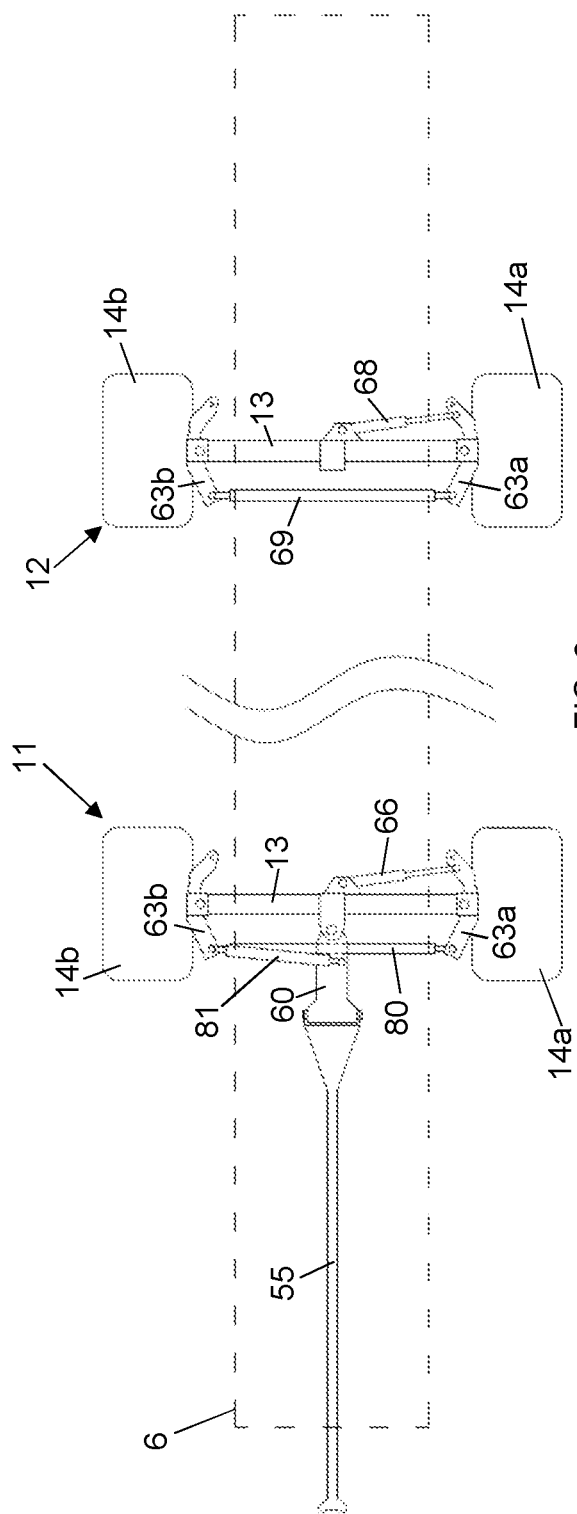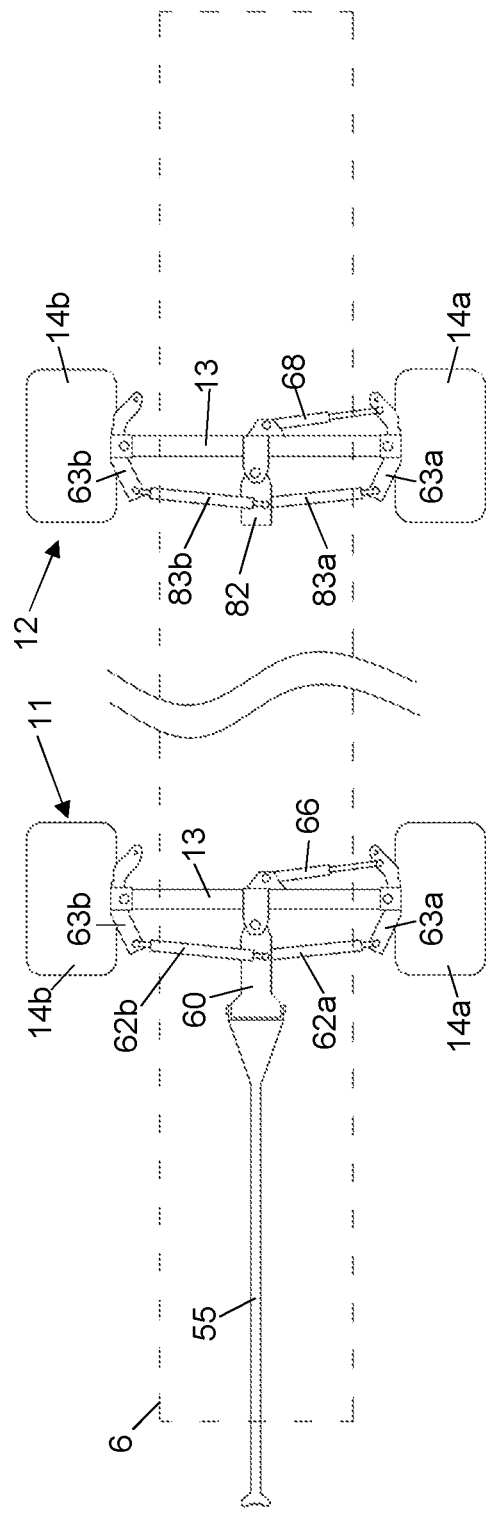

COMBINE HEADER EQUIPPED WITH AN AUTOMATED HEADER TRANSPORT SYSTEM AND HEADER STEERING MECHANISM

CROSS REFERENCE TO RELATED APPLICATION

This application is the National Stage of International Application No. PCT/EP2019/085465 filed Dec. 16, 2019, which claims priority to European Application No. 18213191.2 filed Dec. 17, 2018, the contents of which are incorporated herein by reference.

FIELD OF THE INVENTION

The present invention is related to self-propelled agricultural working machines, such as combine harvesters or forage harvesters, which are provided with a detachable header. The invention is particularly related to a header that is equipped with a transport system for transporting the header after its detachment from the working machine.

BACKGROUND OF THE INVENTION

The header of a combine or forage harvester is the cutting implement attached to the feeding mechanism at the front of the harvester. The width of the header is large compared to the width of the harvester in order to maximize the harvested crop volume gathered during each run through the field. The header is detachable and needs to be transported to and from the field by a tractor or the like. The classic solution to this is to load the header onto a cart, which is however a time-consuming operation that requires multiple manual interventions. An improved solution is to integrate transport wheels in the header structure, which are pivotable between a field position and a transport position.

An example of such a structure is shown in document EP-A-1905293. When the decoupled header is transported on the road, supported by integrated wheel assemblies of the type shown in EP-A-1905293, specific steering action of the wheels of the assemblies is either not provided, or limited to steering of the front assembly as a whole. Due to the size of the header, this may create difficulties when the header transport travels along a curved trajectory.

Furthermore, the combine harvester described in EP-A-1905293 comprises a header that is pivotable about a horizontal axis with respect to the feeder of the combine and provided with locking mechanisms for preventing the pivoting of the header during the field operation. Transport wheel assemblies are integrated in the header and can be swiveled from a field position to a transport position and vice versa when the header is lifted up by the combine's feeder. The transition from the field position to the transport position is initiated by lifting up the header and actuating the swivel movement when the header is fully lifted. Then, when the locking mechanisms between the header and the feeder are released, the pivotable arrangement of the header itself enables the header's movement towards the transport position through the influence of gravity as the feeder is brought down, resulting in the header being tilted vertically when the transport position is reached. A disadvantage of this system is that the pivotable arrangement between the header and the feeder represents a technically complex deviation from the standard coupling mechanism between the header and the feeder. The standard system includes a horizontal beam at the back of the header, that rests in a U-shaped profile at the front of the feeder, while laterally placed locks maintain the header attached close the front face of the feeder. The detachment of the header from the feeder includes releasing the locks and lowering the feeder until the beam disengages from the U-profile. This system is distinct from the pivoting arrangement described in EP-A-1905293. The beam and U-profile do not allow a pivoting movement of the header relative to the feeder. The system of EP-A-1905293 would therefore not be applicable to the standard header/feeder coupling.

Finally, when operating in the road transport mode, the header is attached to a towing vehicle, which requires a drawbar to be coupled between the vehicle and the header. Presently known headers equipped with transport wheels, as for example shown in EP-A-1905293, are not equipped with a drawbar, so that a drawbar needs to be coupled manually to both the header and the vehicle, which increases the time and effort needed to change from field to road transport mode.

SUMMARY OF THE INVENTION

The invention aims to remedy the above-described disadvantages, and is related to an agricultural working machine and to a header for such a machine, as described in the appended claims. The header comprises two support and transport wheel assemblies, each comprising an axle and two wheels. The wheel assemblies are coupled to the main body of the header by an actuating system that comprises an actuator mechanism configured to swivel the wheel assembly to a position that is transversal to the header when the header is lifted up from the ground.

According to the invention, the header comprises a front and rear wheel assembly equipped with tie rod arrangements for steering the header when it is transported on the road. The wheels of the wheel assemblies are operated as caster wheels whose pivotal position is dictated by the tie rod arrangements. The tie rod arrangement of the front wheel assembly is coupled to a pivotable base that is connected to or connectable to a drawbar. The two wheel assemblies comprise respective actuators which are synchronized so as to synchronize the position of the front and rear wheels. The synchronization allows steering of the wheels of the front and rear assemblies in opposite directions, so that the header has a better capability of following a curved trajectory in the road.

The front wheel assembly may be equipped with a drawbar that is deployable from a storage position to a deployed position, wherein the movement of the drawbar between said positions is synchronized with the swivel movement of the wheel assembly. Likewise, the rear wheel assembly may comprise a signal bar that is deployable between a storage position and a road transport position, the movement of the signal bar between these positions being synchronized with the swivel movement of the rear wheel assembly.

According to an embodiment, the actuating system for moving the wheel assembly from the field mode to the transport mode and vice versa comprises two actuator mechanisms. When changing from the field mode to the transport mode, the first actuator mechanism brings the wheel assembly forward from a position behind the header, after the header has been lifted up from the ground. After completion of this first movement, a second actuator mechanism swivels the wheel assembly to a position that is transversal to the header, after which the header is lowered to the ground. The two-step approach enables the change-over between field mode and transport mode without pivoting or otherwise moving the header relative to the feeder. According to an embodiment, the wheel axle is pivotably suspended from a frame element that executes the swiveling movement. According to a further embodiment, the actuating system is coupled to the axle of the wheel assembly in an out-of-center position of the axle.

The invention is in particular related to a self-propelled agricultural working machine comprising at the front of the machine a feeder configured to be moved up or down, and a header that is detachably coupled to the front of the feeder, wherein the header comprises a back wall and two support and transport wheel assemblies on either side of the feeder, designated as front and rear wheel assemblies, the front and rear wheel assembly comprising an axle and two wheels attached at the two ends of the axle, the assemblies being movable between a field position wherein the axle is essentially parallel to the longitudinal direction of the header and a transport position wherein the axle is transversal to said longitudinal direction, wherein the header comprises two actuating systems configured to move the wheel assemblies from the field position to the transport position and vice versa, and wherein the wheels of the wheel assemblies are pivotable relative to their respective axles and about axes which are transversal to said axles, in order to steer the wheel assemblies, and wherein:

the front wheel assembly comprises:
  a pivotable base that is pivotably connected to a central location of the axle of the front wheel assembly, the base being pivotable about an essentially vertical axis, and optionally a deployable drawbar coupled to said pivotable base,
  a first tie rod arrangement configured to transfer the pivotal position of the base to the wheels of the front wheel assembly,
  a first variable length actuator pivotably coupled to the axle of the front wheel assembly and to one of the wheels of said front wheel assembly, the rear wheel assembly comprises:
  a second tie rod arrangement configured to transfer the pivotal position of one rear wheel to the other rear wheel,
  a second variable length actuator pivotably coupled to the axle of the rear wheel assembly and to one of the wheels of the rear wheel assembly, and wherein the operation of the variable length actuators of the front and rear wheel assemblies is synchronized, so as to synchronize the pivotal positions of the wheels of the front and rear wheel assemblies.

According to an embodiment, the first tie rod assembly comprises a pair of tie rods pivotably coupled between the respective wheels of the front wheel assembly and the pivotable base.

According to an embodiment, the first tie rod assembly comprises:
  a first tie rod pivotably coupled between the wheels of the front wheel assembly, in such a way that the first tie rod transfers the pivotal position of one front wheel to the other front wheel,
  a second tie rod pivotably coupled between one of the wheels of the front wheel assembly and the pivotable base.

According to an embodiment, the second tie rod arrangement consists of a single tie rod that is pivotably coupled between the wheels of the rear wheel assembly, in such a way that the single tie rod transfers the pivotal position of one rear wheel to the other rear wheel.

The working machine according to the invention may comprise a second pivotable base pivotably connected to a central location of the axle of the rear wheel assembly, the second base being pivotable about an essentially vertical axis, and wherein the second tie rod arrangement comprises a pair of tie rods pivotably coupled between the respective wheels of the rear wheel assembly and the second pivotable base.

The working machine according to the invention may comprise a second pivotable base pivotably connected to a central location of the axle of the rear wheel assembly, the second base being pivotable about an essentially vertical axis, and wherein the second tie rod assembly comprises:
  a first tie rod pivotably coupled between the wheels of the rear wheel assembly, in such a way that the first tie rod transfers the pivotal position of one rear wheel to the other rear wheel,
  a second tie rod pivotably coupled between one of the wheels of the rear wheel assembly and the second pivotable base.

According to an embodiment, the first and the second actuator are synchronized in such a way that the wheels of the rear wheel assembly pivot in a direction opposite to the pivot direction of the wheels of the front wheel assembly.

According to an embodiment, the first and second variable length actuators are hydraulic actuators which are hydraulically coupled.

According to an embodiment, at least one of the actuating systems configured to move the wheel assembly from the field position to the transport position and vice versa, comprises:
  A first frame element and a first actuator mechanism coupled between the first frame element and the back wall of the header, wherein the first actuator mechanism is configured to actuate a forward movement of the first frame element from a position behind the back wall of the header to a forward position and vice versa, when the header is lifted up to a given height by the feeder,
  A second frame element and a second actuator mechanism coupled between the first and the second frame element, wherein the axle of the wheel assembly is coupled to the second frame element, and wherein the second actuator mechanism is configured to actuate a swivel movement of the second frame element and thereby of the axle and the wheels, relative to the first frame element, when the first frame element is in the forward position, the swivel movement being configured to bring the wheel assembly to or from a position wherein the axle is transversal to the longitudinal direction of the header.

In the latter embodiment, the axle of the wheel assembly may be pivotably suspended from the second frame element, so that the axle is freely pivotable relative to the second frame element when the wheel assembly is lifted up from the ground.

The axle may be pivotable relative to the second frame element, about a pivot axis that is essentially perpendicular to the axle.

The axle may be coupled to the second frame element in an out-of-center location of the axle.

According to an embodiment, the first actuator mechanism comprises:
  two arms having ends which are pivotably coupled to the header and to the first frame element in two respective pairs of pivot axes which are essentially perpendicular to the arms, said 4 pivot axes defining a parallelogram in a plane perpendicular to the arms, regardless of the pivotal positions of the arms, a variable length actuator pivotably coupled between a first pivot on the header and a second pivot on one of the arms.

One of the arms of the parallelogram-mechanism may be hook shaped to avoid collision of the arm with a drive axle that is part of the header.

The first actuator mechanism may comprise two pairs of said two arms, wherein both pairs of arms are pivotable about said 4 pivot axes, wherein the first arms of the two pairs are fixedly connected at their ends by spindles or equivalent connections, and wherein the second arms of the two pairs are positioned on either side of the first arms.

According to an embodiment, the second actuator mechanism comprises an arm fixed to the first or second frame element, and a variable length actuator coupled between a first pivot on said arm and a second pivot on the other frame element.

According to an embodiment, the header comprises a deployable support arm and the axle of the wheel assembly comprises a receptacle, configured to receive the end of the deployable support arm when the arm is in a deployed state, and when the wheel assembly is lowered to the ground after moving from the field position to the transport position by the consecutive actions of the first and second actuator mechanism.

According to an embodiment, the first actuator mechanism is configured to control the height of the header when the working machine is in the field mode.

According to an embodiment, the front wheel assembly comprises a deployable drawbar, that is pivotable relative to the pivotable base between an essentially vertical storage position and an essentially horizontal deployed position, the wheel assembly further comprising a drawbar actuator configured to actuate a pivoting movement of the drawbar between said two positions, and wherein the actuator mechanism of the swivel movement and the drawbar actuator are configured so that the pivoting movement of the drawbar is synchronized with the swivel movement of the axle, so that the drawbar is brought from the storage position to the deployed position as the wheel assembly swivels towards the transversal position of the axle, and vice versa According to an embodiment, the swivel actuator mechanism comprises a hydraulic variable length actuator and wherein the drawbar actuator is equally a hydraulic variable length actuator that is hydraulically coupled to the actuator of the swivel actuator mechanism.

According to an embodiment, the rear wheel assembly comprises a signal bar that is pivotable between a storage position and a road transport position, the road transport position being essentially parallel to the axle of the rear wheel assembly, and further comprising a signal bar actuator configured to actuate a pivoting movement of the signal bar between said two positions, and wherein the actuator mechanism of the swivel movement and the signal bar actuator are configured so that the pivoting movement of the signal bar is synchronized with the swivel movement of the rear wheel assembly, so that the signal bar is brought from the storage position to the deployed position as the rear wheel assembly swivels towards the transversal position of its axle and vice versa.

According to an embodiment, the actuator mechanism of the swivel movement comprises a hydraulic variable length actuator and/or wherein the drawbar actuator is a hydraulic variable length actuator and wherein the signal bar actuator is a hydraulic variable length actuator that is hydraulically coupled to the actuator of the actuator mechanism of the swivel movement or to the drawbar actuator.

The working machine according to the invention may be a combine harvester or a forage harvester.

The invention is equally related to a detachable header for an agricultural working machine in accordance with the invention.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings:

FIGS. 1a and 1b represent a side view and a back view of a combine harvester according to an embodiment of the invention.

FIGS. 2a and 2b represent an enlarged side view and a back view of one of the support and transport wheel assemblies of the header of the combine harvester of FIGS. 1a and 1b.

FIGS. 4a and 4b show a side view and a back view of a wheel assembly for the header of a combine harvester, in accordance with an embodiment of the invention, wherein the wheel assembly is equipped with a drawbar operated synchronously with the swivel movement of the wheel assembly.

FIGS. 5b and 5c illustrate the operation of the steering arrangement of FIG. 5a.

FIGS. 6a and 6b illustrate alternative steering arrangements which perform the same function as the arrangement shown in FIG. 5a.

DETAILED DESCRIPTION OF THE INVENTION

Figure 2C:
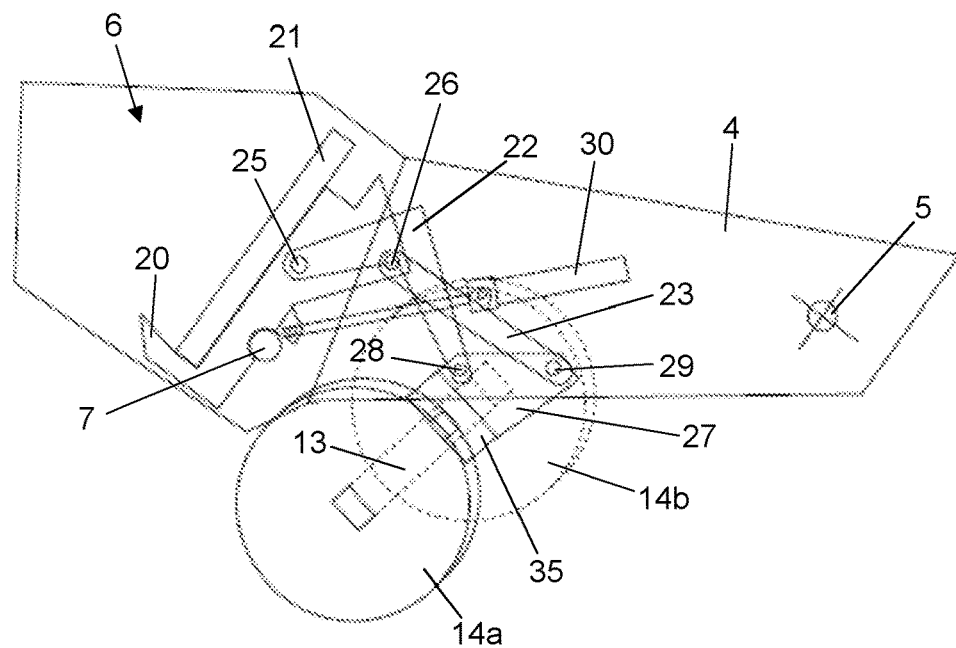
FIGS. 2c to 2h illustrate the sequence of actions for bringing the wheel assembly from the field mode to the transport mode.

Preferred embodiments will now be described with reference to the drawings. The detailed description is not limiting the scope of the invention, which is defined only by the appended claims. The figures are schematic and intended to illustrate the general principle of the invention, rather than represent technical drawings of a fully operative mechanical system.

FIGS. 1a and 1b illustrate two views of a combine harvester 10 in accordance with an embodiment of the invention. The main body 1 of the harvester is represented along with the front and rear wheels 2 and 3 and the driver's cabin 9. At the front, a feeder 4 is pivotably attached. Pivoting of the feeder about a transversal axis 5 preferably takes place through a hydraulic lift system, not shown in the drawing but known as such. A header 6 is removably attached to the front face of the feeder 4, when the harvester is operating in field mode, which is the mode depicted in FIGS. 1a and 1b. The header 6 is preferably attached to the feeder by a coupling system (not shown) that does not allow pivoting of the header relative to the feeder around a given pivot axis. Preferably the coupling system is the standard coupling system referred to above, including a beam on the header and a U-profile on the feeder.

The header 6 comprises knives and augers or belts (not shown) to cut crops from the field and move the crops towards the center area of the header, where the crops enter the feeder 4. Inside the feeder 4, the crops are channeled towards the main body 1 of the harvester where they are further processed. When the harvester 10 is operating in the field mode, the header 6 is close to ground level as the combine moves through the field. A pair of drive axles 7 is mounted at the back of the header. These axles are operatively coupled to the movable cutting and crop transport means of the header 6, and to the power source of the combine, in a manner known as such by the skilled person.

The header 6 is equipped with two support and transport wheel assemblies 11 and 12, one on each side of the feeder 4 and arranged symmetrically with respect to the feeder 4, each wheel assembly comprising an axle 13 with two wheels 14a and 14b mounted at the outer ends of the axle 13, the wheels being rotatable relative to the axle 13 so as to enable rolling of the assemblies 11 and 12 on the ground. In field mode, as illustrated in FIGS. 1a and 1b, the wheel assemblies 11 and 12 support the header 6, thereby alleviating some of the load exerted by the header's weight on the feeder 4. The wheel assemblies 11 and 12 furthermore have the function of acting as transport wheel assemblies for transporting the header 6 once it is detached from the feeder 4. The manner in which these wheel assemblies are moved from the field mode position to the transport mode position and vice versa is different from the prior art.

As seen in FIGS. 1a and 1b, each of the two wheel assemblies 11 and 12 is coupled to the header through an actuating system 15, that is coupled to the axles 13 of the wheel assemblies 11 and 12. In the embodiment shown in the drawings, the actuating system is coupled to the axles in an out-of-center position of the axles 13, which is an advantageous feature but not a limiting feature to the scope of the present invention. The operation of the actuating systems 15 is explained with reference to FIGS. 2a to 2h. The main components are shown in transparent view in the side view images, in order to visualize these various components and their interaction.

FIGS. 2a and 2b show an enlarged image of the field mode position of the left-hand side wheel assembly 11, as seen in a side view and from the back. The header 6 comprises side plates 19 and a back wall 21, as well as a pair of metal plate elements 20, which are uniform with or fixedly attached, preferably welded to the back wall 21. In the embodiment shown (but this is not a limiting characteristic that defines the scope of the invention), the plate elements 20 comprise a semi-circle shaped notch which provides space for the drive axle 7. A pair of mutually parallel hook-shaped arms 22 and a pair of mutually parallel straight arms 23 are pivotable relative to the steel plate elements 20, about pivot axes which are essentially parallel to the longitudinal direction of the header 6. The straight arms 23 are fixed to each other by axle elements 24 at their outer ends. Each hook-shaped arm 22 and each straight arm 23 is pivotably coupled to the plate elements 20 in a first and second pivot 25 and 26 respectively. The arms 22 and 23 are further pivotable relative to a first frame element 27, to which they are coupled in a third and fourth pivot 28 and 29. The four pivots 25/26/28/29 are forming a parallelogram that is deformable by a hydraulic variable length actuator 30 comprising a cylinder 31 and an extendable shaft 32. The cylinder 31 is pivotably coupled to the straight arms 23 in a first pivot 33. The extendable shaft 32 of the actuator 30 is pivotably coupled to the plate elements 20 in a second pivot 34. As shown in FIG. 2a, the extendable shaft 32 is extended out of the cylinder 31, when the header 6 is operating in field mode.

A second frame element 35 is pivotably coupled to the first frame element 27. Pivoting of the second frame element 35 relative to the first frame element 27 is enabled by a second hydraulic variable length actuator 40. One end of the actuator 40 is pivotably connected in pivot 49 to the distal end of an arm 41 that is uniform with or otherwise fixedly attached to the second frame element 35, and the other end of the actuator 40 is pivotably connected to the first frame element 27, in pivot 48. The arm 41 and the second actuator 40 are only shown in the back view in FIG. 2a, not in the side view, in order not to complicate the drawing. The arm 41 is shaped and the pivots 49 and 48 are positioned so that the extension of the actuator 40 (i.e. the lengthening of the actuator 40) actuates a swivel movement of the second frame element 35 and thereby of the axle 13 and the wheels 14a and 14b, relative to the first frame element 27. The swivel movement is a rotation of the second frame element 35 relative to the first frame element about an axis 44 through both frame elements, which may be realized by a suitable rotatable coupling between the two frame elements. In an equivalent embodiment, the support arm 41 may be fixed to the first frame element 27 instead of to the second frame element 35, with the second actuator 40 coupled between the end of the arm 41 and a pivot on the second frame element 35.

In the embodiment of FIGS. 2a to 2h, the rotation axis 44 is non-perpendicular to the axle 13. However, this is not a limitation to the scope of the invention. Furthermore, in the embodiment shown in the drawings, the axle 13 of the wheel assembly 11 is pivotably suspended from the second frame element 35 at pivot 42, allowing the axle 13 to pivot freely about an axis 43 that is perpendicular to the axle 13 itself. This latter aspect is also not a limiting feature to the present invention.

Figure 2D:
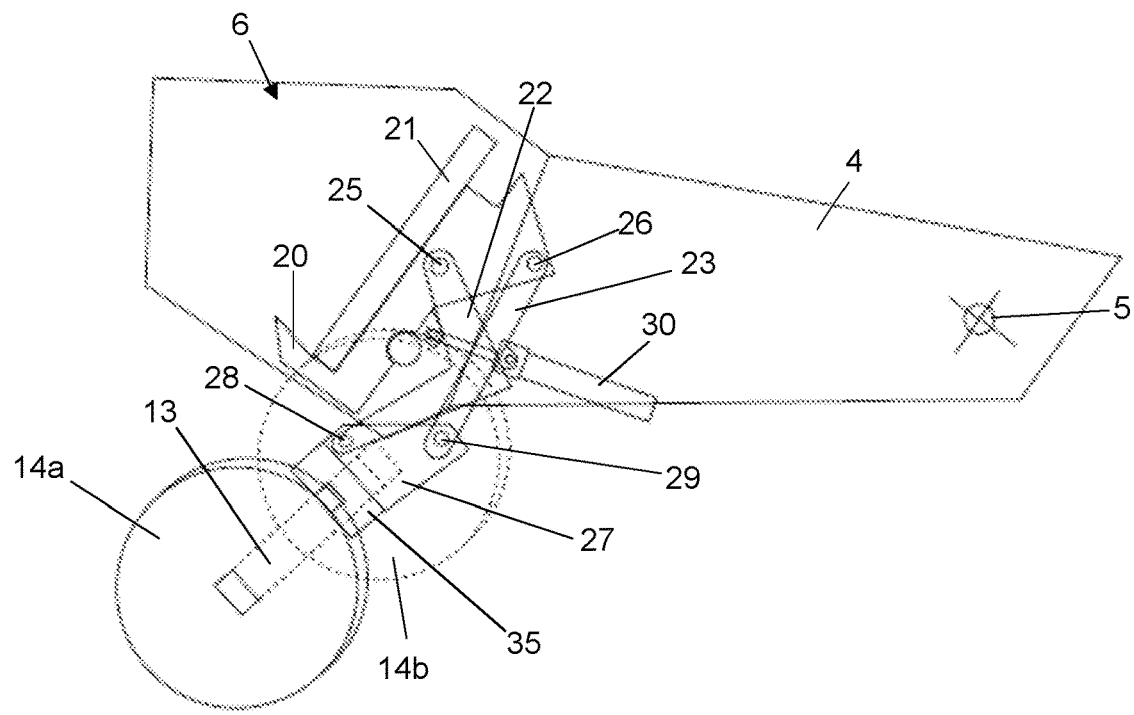

The change from field mode to transport mode starts with the feeder 4 lifting up the header 6, preferably up to its highest lifting position, as illustrated in FIG. 2c. The feeder 4 is pivoted about transversal axis 5 by the combine's hydraulic lift system (not shown). When the feeder 4 is lifted up, the axle 13 is out of balance because of the eccentric pivot 42 and under the influence of gravity, the axle 13 swings downward on the side furthest from the pivot 42, i.e. wheel 14a is closer to the ground than wheel 14b. When the header 6 reaches a predefined height, the extendable shaft 32 of the first actuator 30 is retracted, thereby deforming the parallelogram 25/26/28/29 with the effect of moving the wheel assembly 11 forward, as seen in FIG. 2d. The reason for the hook-shape of the arms 22 of the parallelogram now becomes apparent. The hook shape is needed to operate the mechanism without colliding with the drive axle 7 of the header. As the wheel assembly is brought forward by the first actuator 30 into the position shown in FIG. 2d, the axle 13 is still in a non-horizontal position i.e. the wheel 14a furthest from the pivot point 42 hangs closer to the ground than the wheel 14b closest to the pivot point 42.

Figure 2E:
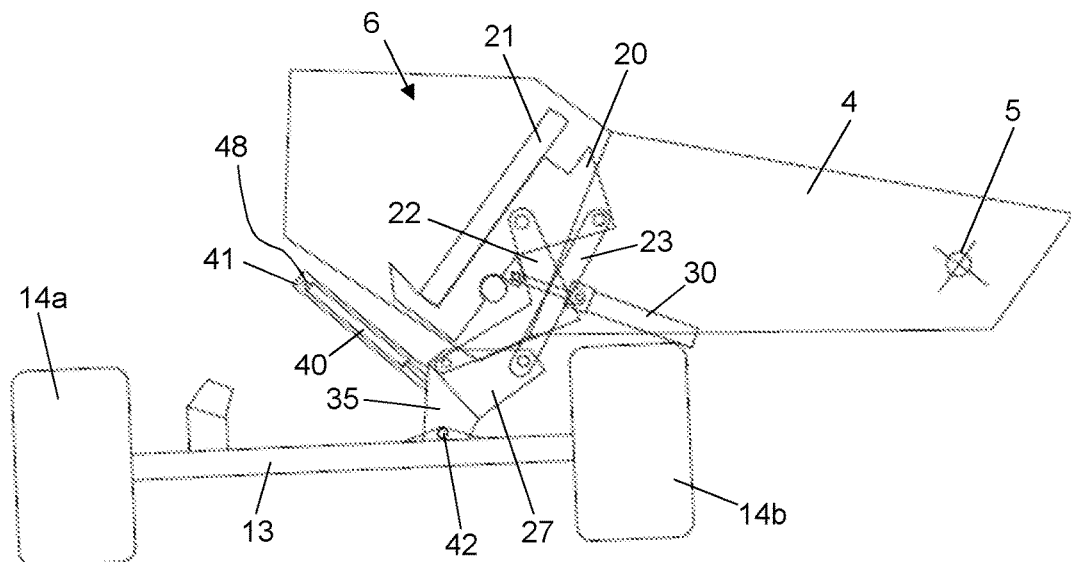
Figure 2F:
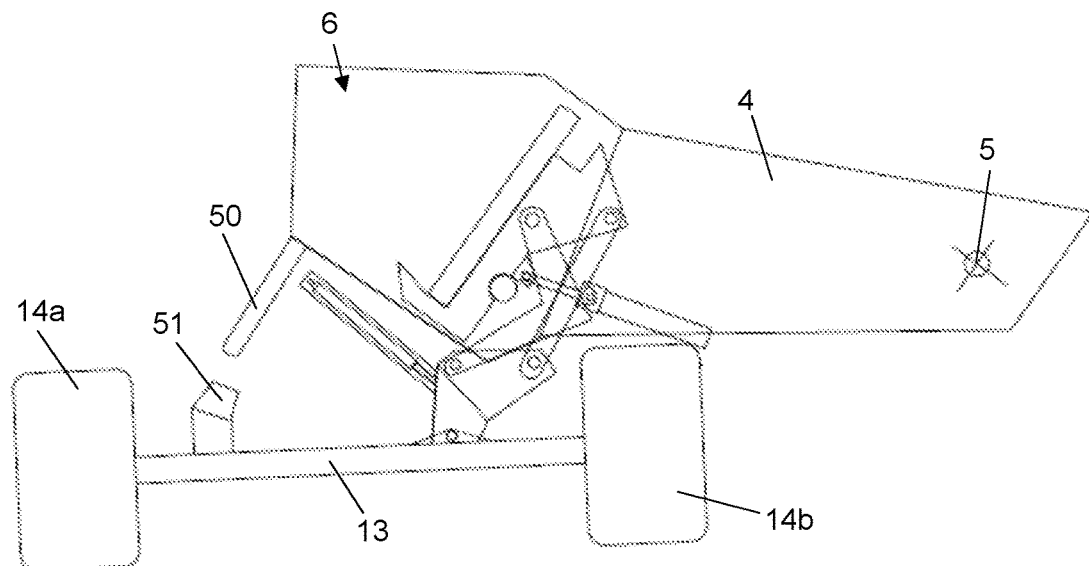
Figure 2G:
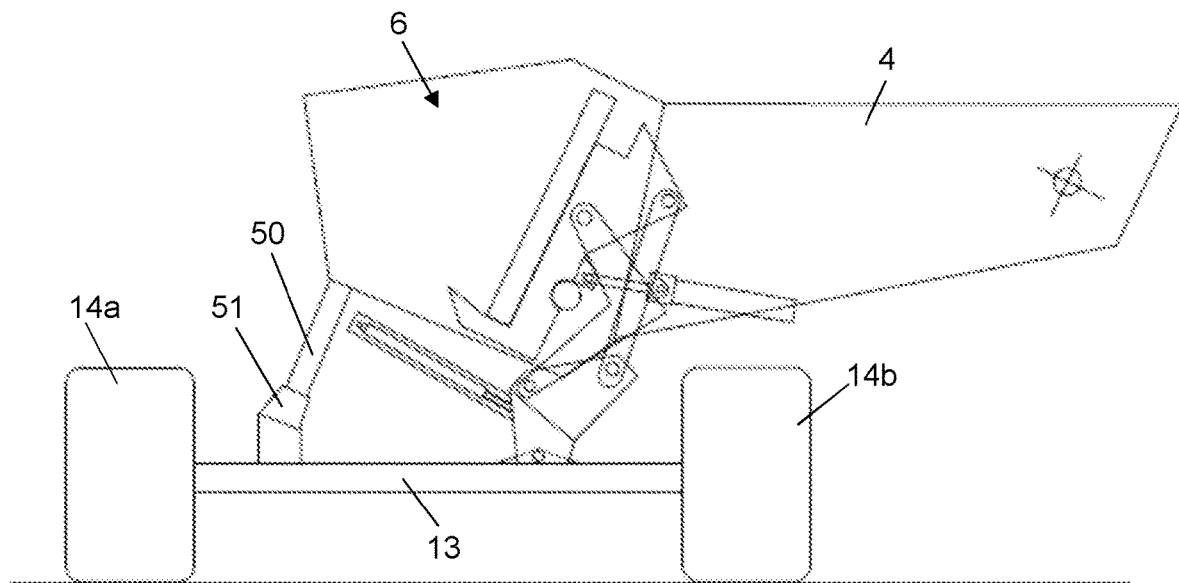
Figure 2H:
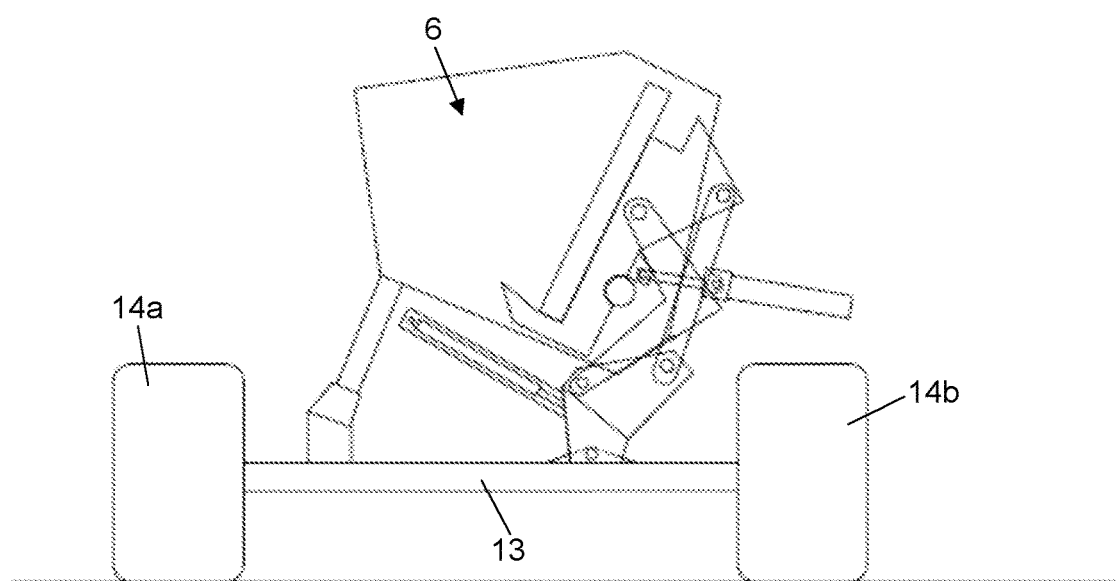

The above-described movement of the wheel assembly 11 is followed by the swiveling of the second frame element 35 relative to the first frame element 27, over an angle of approximately 90°, resulting in the movement of the wheel assembly 11 towards a position that is transverse to the header 6, as illustrated in FIG. 2e. This movement is realized by the second actuator 40 being extended in length. In the position of FIG. 2e, the left-hand wheel 14a is still closer to the ground than the right-hand wheel 14b. FIG. 2f shows a support arm 50 being pivoted downward from the bottom section of the header 6. The support arm's pivoting movement from a position parallel with the header's underside to the position shown in FIG. 2f and vice versa is controlled by a suitable actuator (not shown). The axle 13 of the wheel assembly 11 comprises a receptacle 51 configured to receive the end of the support arm 50. The feeder is now lowered to the ground, as illustrated in FIG. 2g. When the left-hand support wheel 14a touches the ground, the pivot axis 42 enables a pivoting movement of the axle 13 relative to the header 6, until the support arm 50 enters the receptacle 51, where it is preferably secured by a suitable locking mechanism. After that, the header 6 is released from the feeder, leaving the header supported by the wheel assemblies 11 and 12 (FIG. 2h).

The reverse transition, from transport mode to field mode, equally takes place in two stages. It is described hereafter in the preferred case wherein the wheel assembly described in relation to FIGS. 2a to 2h is present on both sides of the combine, i.e. wheel assemblies 11 and 12 are present as shown in FIGS. 1a and 1b. The header 6 is first transported to a pick-up position and de-coupled form the towing vehicle. The combine then approaches the header until the feeder 4 engages the header and the mechanical coupling between feeder and header is secured. Further mechanical, hydraulic and possibly electrical connections between the header and the combine's respective power sources are then established in any manner known as such. After releasing the lock mechanism that secures the support arms 50 from their respective receptacles 51, the header is lifted up to the height as shown in FIG. 2f, and the support arms 50 are pivoted back towards their storage position shown in FIG. 2e. Then the swivel movement of the second frame element 35 relative to the first frame element 27 is actuated by the second actuator 40, bringing the wheel assemblies 11 and 12 into the position shown in FIG. 2d, followed by the reverse movement of the wheel assemblies through the parallelogram mechanism actuated by the first actuator 30, until reaching the position shown in FIG. 2c. The header 6 is then lowered and as soon as one of the wheels of each assembly touches the ground, the wheel assemblies are brought in line with the longitudinal direction of the header 6, through the free pivoting movement of the assemblies 11 and 12 about the pivots 42 (and pivot axes 43).

As stated above, the parallelogram mechanism is just one example of a mechanism that can bring the wheel assembly from the position in FIG. 2c to the position in FIG. 2d. Alternative mechanisms can be applied for this purpose, for example a linear actuator mounted on the back wall 21 of the header 6.

The two-step approach (bringing the wheel assembly forward and then swiveling the wheel assembly or vice versa) results in a system that allows to bring the wheels into the transport position without any movement of the header as a whole relative to the feeder. The invention is thereby compatible with the standard system for coupling the header to the feeder, involving a beam and a U-profile, as described above, or with any other header/feeder coupling system that does not allow a movement of the header relative to the feeder while the two are coupled.

The non-central position of the swivel axis 44 relative to the axle 13 is advantageous in that it results in a compact overall structure. Due to the non-central position, the actuating mechanism (the parallelogram in the embodiments shown) used to bring the wheel assembly forward can be a compact mechanism, ensuring that during transport mode, the header is positioned with its center of gravity sufficiently low to ensure the stability of the header while being transported on the road. However, a central position of the swivel axis 44 relative to the axle 13 is not excluded from the scope of the invention.

Likewise, the feature of the axle 13 being pivotably suspended from the second frame element 35, the axle 13 being pivotable about axis 43, is a preferred feature but not a limiting feature of the invention. Especially when it is combined with the non-central position of the swivel axis 44, this feature enables the above-described gravity-induced tilting of the wheel assembly when the header is lifted up, i.e. one wheel hangs closer to the ground than the other due to the out-of-center position. This tilting may facilitate the passage of the wheels underneath the header during the subsequent swivel movement. Also, the fact that the axle 13 is freely pivotable relative to the second frame element 35 enables the automatic engagement of the support arm 50 into the receptacle 51, as the header is lowered to the ground.

If the axle 13 is not pivotably suspended from the second frame element 35, the design and size of the actuating system 15 must take into account the available space for allowing the swivel movement to take place without obstruction from the header or other components of the harvester. The angle at which the axle 13 is oriented after the swivel movement should be compatible with the feeder movement executed for lowering the header, so that the wheel assembly arrives on the ground in an essentially horizontal position. Also, specific stabilization means may be required for anchoring the header relative to the wheel assemblies during the transport mode. This could be achieved by increasing the dimensions of the second frame element 35, and/or by providing one or more support arms similar to the arm 50 and corresponding receptacles and locking mechanisms, but which do not rely on a tilting movement of the header to engage with a receptacle.

A preferred embodiment of a work machine, and of a header according to the invention is equipped with two wheel assemblies 11 and 12, placed on either side of the work machine, as in the embodiment described in FIGS. 1a and 1b, wherein both wheel assemblies 11 and 12 are provided with a two-step actuating mechanism according to the invention. The scope of the invention however also includes a work machine and a header comprising one wheel assembly configured according to the invention, mounted on one side of the header. On the other side of the header, either no transport means are provided, in which case that side of the header needs to be placed onto a cart or other transport means for enabling road transport, or the other side of the header may be equipped with a wheel assembly that is not according to the invention.

Figure 3A:
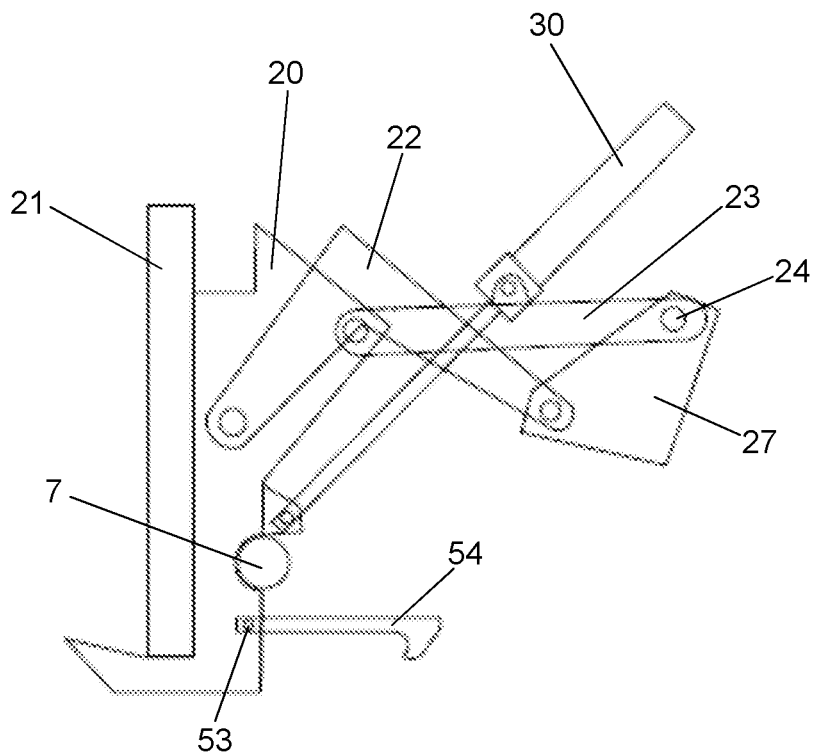
FIGS. 3a and 3b illustrate a locking mechanism for securing part of the wheel assembly to the header during the change from the field mode to the transport mode.
Figure 3B:
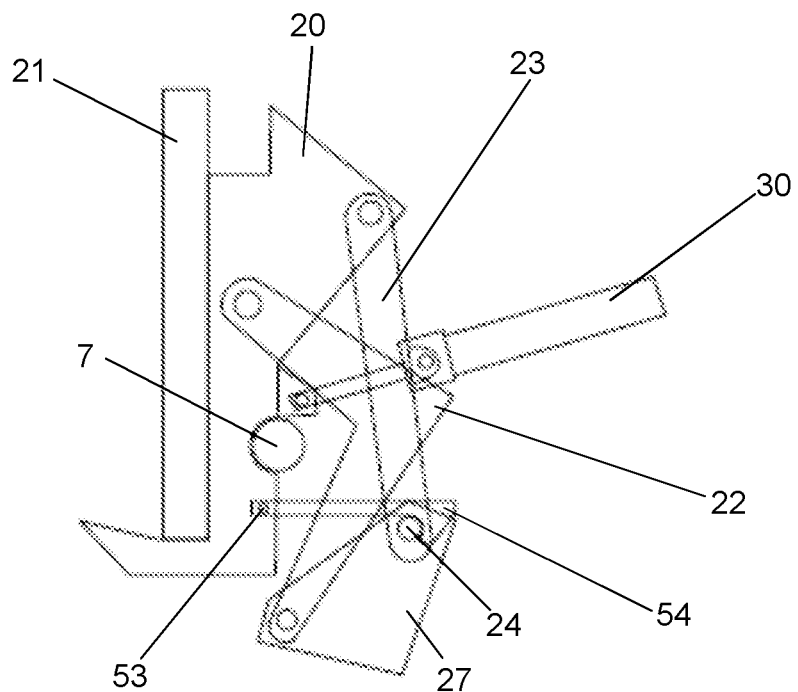

FIGS. 3a and 3b illustrate a locking mechanism for the parallelogram 25/26/28/29 that may be implemented according to an embodiment of the invention. The locking mechanism comprises a hook 54 that is pivotably connected to the plate elements 20 which are uniform with or fixedly attached to the header's back wall 21. For example, the hook is pivotable about an axle 53 coupled between the plate elements. The hook has a round shape designed so that the hook is pushed upward when it comes into contact with a spindle-shaped axle element 24 between the pair of straight arms 23 of the parallelogram mechanism. When the parallelogram approaches its end position, the axle element 24 thus pushes the hook 54 upwards, until the hook engages with said axle element, thereby securing the parallelogram to the header (FIG. 3b). The release of this locking mechanism may be done manually, by lifting up the hook 54, thereby allowing the parallelogram to move the wheel assembly back towards the field position. Alternatively, the release may be automated, by an actuator configured to lift up the hook 54 upon a command initiated from the driver's cabin.

During the transitions from field mode to transport mode and vice versa described above, both hydraulic actuators 30 and 40 of the first and second actuating mechanisms are preferably driven by the hydraulic circuit of the harvester. When the header is decoupled from the harvester, both actuators are thereby depressurized. The actuators 30 and 40 may be mechanically blocked by suitable locking mechanisms in their respective transport mode positions, in order to avoid unwanted movements of the header during road transport, insofar as such movements are not already blocked by the support arm 50 and its locking means into the receptacle 51, or by any support and locking means equivalent thereto.

The second hydraulic actuator 40 may be depressurized during the field mode (i.e. decoupled from the hydraulic circuit), and is preferably blocked in its field mode position in order to avoid unwanted swiveling movements of the wheel assembly in the field.

The first hydraulic actuator 30 preferably remains pressurized when the combine is operating in the field, the actuator 30 being pressurized in such a manner that the header is actively supported by the wheel assembly. In the embodiments wherein a wheel assembly according to the invention is present on both sides of the feeder (as in FIGS. 1a and 1b), the actuator 30 of both assemblies may be actively controlled for controlling the height of the header. A header height control (HHC) system is known on present day harvesters. The HHC system controls the height of the header by acting on the feeder lift system. The system comprises sensors placed at the front of the header. The sensors detect level changes of the terrain and transmit these changes to an HHC controller, which emits command signals to the feeder lift system, thereby maintaining or controlling the header height. According to an embodiment, the actuators 30 are incorporated in the header height control system of a work machine. During field operations, the actuators 30 may thus be actively operated via control signals generated by the HHC controller, for controlling the header height specifically at the location of the wheel assemblies. The HHC control system may be a system as known in the art, i.e. a system that acts on the lift system of the feeder. In this case, the control of the actuators 30 may be configured to interact with the feeder lift control, for example by copying the actions of the feeder lift system. Alternatively, the control of the actuators 30 may be fully or partially independent from the control of the feeder lift system.

One of the wheel assemblies is designated to be coupled to a towing vehicle when the wheel assembly is in the transport position. According to an embodiment of the present invention, this wheel assembly comprises a deployable drawbar that is deployed in a synchronized manner with the swiveling movement of the wheel assembly. This embodiment of the invention is not limited to the two-step actuating system as described above, but will be described in combination with this particular actuating system. The embodiment is however applicable also to headers comprising integrated wheel assemblies equipped with other actuating systems, as for example the system described in EP-A-1905293. This embodiment is thus applicable to any header comprising a wheel assembly and provided with any system that enables a swivel movement of the wheel assembly from a field position of the wheels to a road transport position.

FIGS. 4a and 4b show the same wheel assembly 11 as illustrated earlier in FIGS. 2a to 2h, but this wheel assembly 11 is now equipped with a drawbar 55 that is automatically deployed when the wheel assembly 11 is swiveled from the field position to the transport position. The assembly 11 is thereby designated as the front wheel assembly while the other assembly 12 is designated as the rear wheel assembly. When the front wheel assembly 11 is in the field position, the drawbar 55 is directed upward in an essentially vertical storage position, as seen in FIG. 4a. The drawbar 55 is pivotably coupled to an extension 56 that is attached to the axle 13 of the front wheel assembly 11, in a central position between the wheels 14a and 14b. The extension 56 may itself be pivotable relative to the axle 13 about a vertical axis, or it may be fixed to the axle, depending on the steering mechanism used for steering the wheels in the transport mode. In the drawings, the extension 56 is shown to be fixed to the axle 13, but the invention is not limited to that embodiment.

Figure 4C:
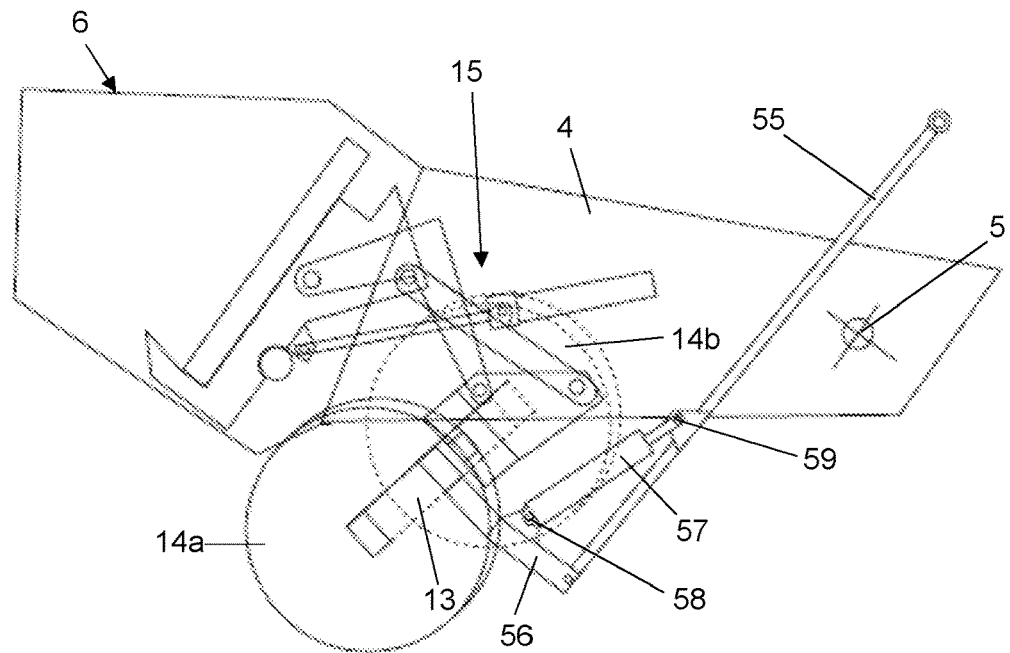
FIGS. 4c to 4f illustrate the movement of the drawbar as the wheel assembly is brought from the field mode to the transport mode.
Figure 4D:
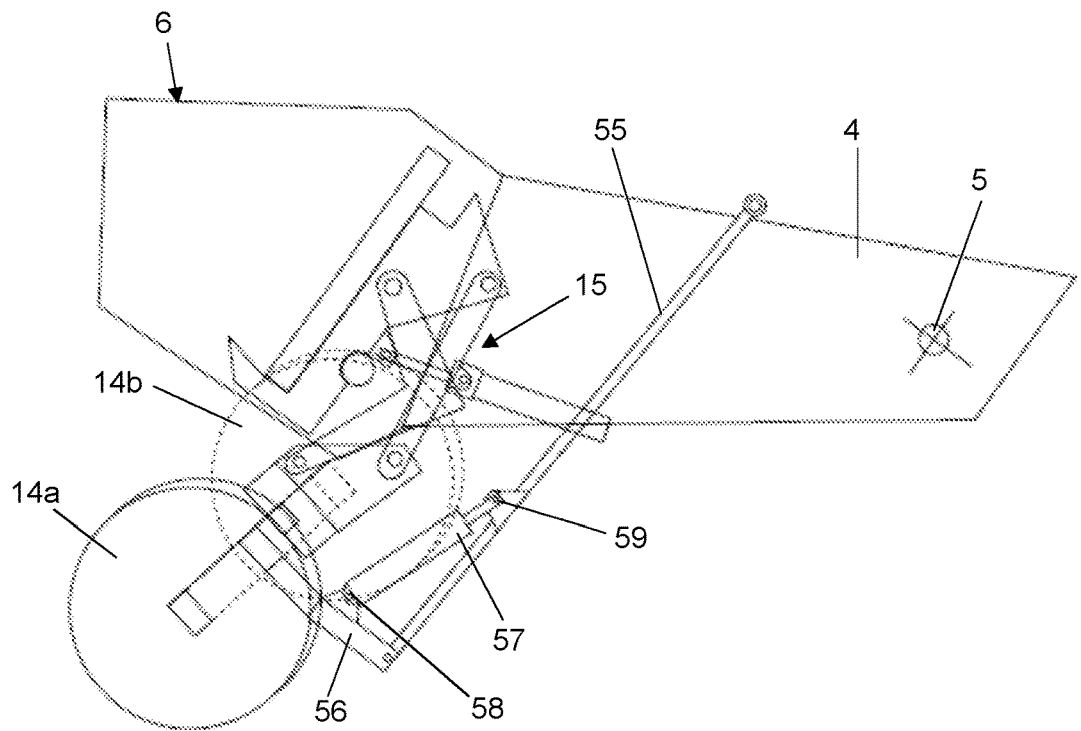
Figure 4E:
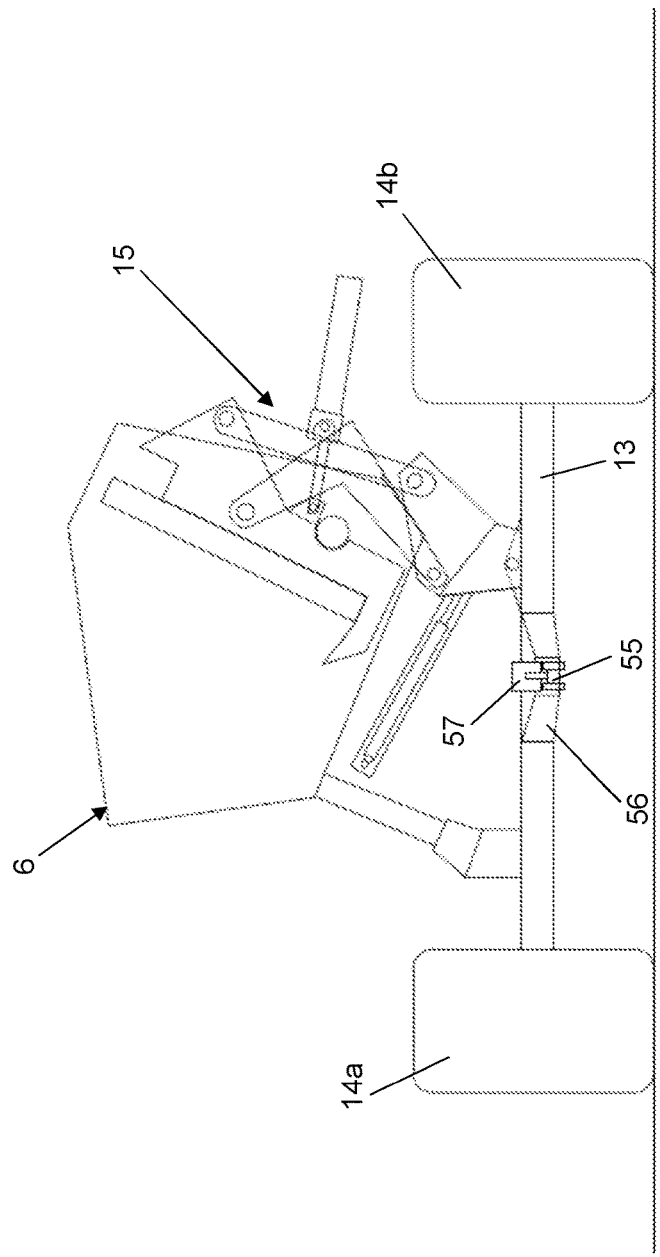
Figure 4F:
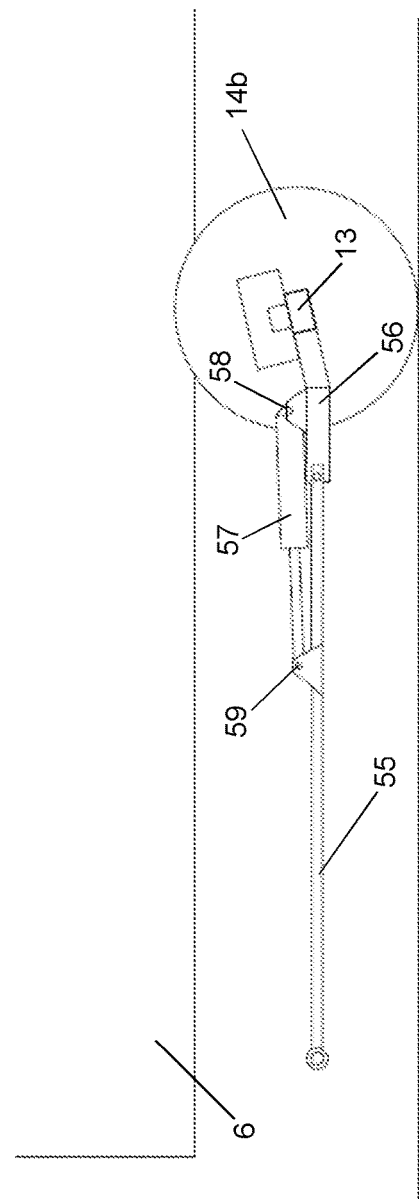

The pivoting movement of the drawbar 55 is controlled by a hydraulic drawbar actuator 57 that is hydraulically coupled to the second actuator 40 of the actuating system 15 for moving the front wheel assembly 11 from the field mode to the transport mode and vice versa. Actuator 57 is coupled between pivots 58 and 59, respectively located on the extension 56 and on the shaft of the drawbar 55. During field mode operation, illustrated in FIGS. 4a and 4b, the extendable shaft of actuator 57 is retracted into its cylinder, thereby maintaining the drawbar 55 in its upright position. When the header 6 is first lifted up and when the wheel assembly 11 is moved forward by the first actuator 30, the drawbar 55 remains in its vertical position relative to the header 6, as shown in FIGS. 4c and 4d. The hydraulic coupling between actuators 40 and 57 implies that hydraulic fluid pumped out of the cylinder of the second actuator 40 when the wheel assembly 11 is swiveled over 90°, as shown in FIGS. 4e and 4f, is pumped into the cylinder of the drawbar actuator 57, in such a manner that the latter actuator 57 is extended in length, thereby bringing the drawbar 55 into a horizontal position. The deployment of the drawbar 55 is thereby synchronized with the swivel movement of the wheel assembly 11, finally leading to the configuration illustrated in FIGS. 4e and 4f (the lower view in FIG. 4f shows only the drawbar mechanism, not the wheel assembly positioning mechanism). The reverse movement of the drawbar 55 is accomplished when changing from the transport mode to the field mode. The swivel movement of the front wheel assembly 11, actuated by the second actuator 40, generates—through the hydraulic coupling between actuators 40 and 57, the upward movement of the drawbar 55 towards its storage position.

According to a preferred embodiment, the rear wheel assembly 12 is furthermore equipped with a moveable signal bar (not shown). The signal bar may comprise taillights and/or reflectors, and possibly any other signalization required for transport of the header on public roads, such as a number plate. In road transport mode, the signal bar is positioned horizontally and essentially parallel to the axle 13 of the rear wheel assembly 12. The signal bar is actuated by a hydraulic actuator that is hydraulically coupled to the actuator 57 or to the actuator 40 of the actuator mechanism that actuates the swivel movement, so that the signal bar is automatically brought from a storage position into the road transport position, as the drawbar 55 is deployed to its horizontal position shown in FIG. 4*f*. The storage position of the signal bar is an essentially vertical or upward position and the actuator coupled to the signal bar is arranged to pivot the signal bar from the storage position into a horizontal position, in a plane that is essentially parallel to the axle 13 of the rear wheel assembly 12.

Figure 5A:
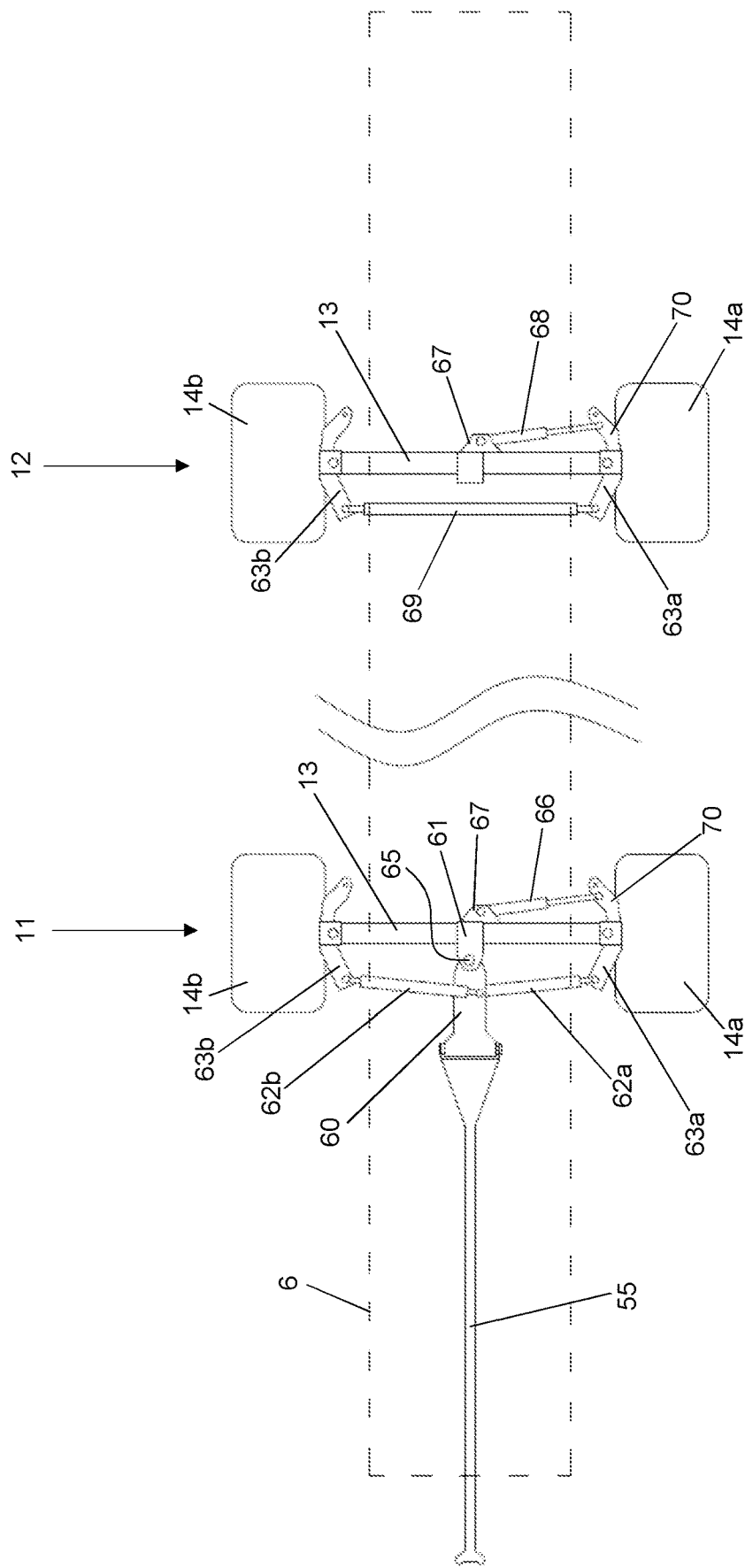
FIG. 5a shows the steering arrangement for the front and rear wheel assemblies of a header in accordance with an embodiment of the invention.

According to the invention, the header of a working machine, for example a combine harvester, is equipped with two support and transport wheel assemblies 11 and 12, each assembly comprising two support and transport wheels 14*a* and 14*b*, which may be similar to the assemblies shown in FIGS. 1*a* and 1*b*. The invention is however applicable also to headers comprising integrated wheel assemblies equipped with other actuating systems, as for example the system described in EP-A-1905293. The invention is thus applicable to any header comprising a wheel assembly and provided with any system that enables a swivel movement of the wheel assembly from a field position of the wheels to a road transport position. In a header according to the invention, the steering of the four wheels in the transport mode is actuated by a mechanism described hereafter. One embodiment of this mechanism is illustrated in FIG. 5*a*, in a top view of the two wheel assemblies in the transport mode. The header 6 comprises a front wheel assembly 11 and a rear wheel assembly 12, wherein the front wheel assembly 11 is the one designated to be coupled to a towing vehicle when the wheels are in the transport position. The front wheel assembly 11 is equipped with a deployable drawbar 55. The drawbar 55 is shown in the fully deployed position. The drawbar may be equipped with a hydraulic actuator as described above, in relation to the previous embodiment, but it may also be a manually deployable drawbar, as is the case in the drawing in FIG. 5*a*. The drawbar 55 is deployable relative to a base 60. The front wheel assembly 11 may alternatively be configured without an integrated drawbar. In that case, an external drawbar is attachable to the base 60. The base 60 is pivotable about a vertical axis 65 with respect to a support 61 that is fixed to the axle 13 in a central position between the wheels 14*a* and 14*b* of the front wheel assembly 11. The steering of the wheels takes place in the manner of castor wheels. To this aim, these wheels 14*a* and 14*b* of both wheel assemblies 11 and 12 are pivotable relative to the axle 13 at the end of which the wheels are attached, about pivot axes which are transversal, preferably perpendicular, with respect to said axle 13. The steering of the wheels is controlled by the position of the pivotable base 60, as dictated by the drawbar 55 when the header is towed by a towing vehicle. For the front wheel assembly 11, this is realized through a pair of tie rods 62*a* and 62*b* which are pivotably coupled between the pivotable base 60 of the tow bar, and a pair of brackets 63*a* and 63*b* which are uniform with the respective wheels 14*a* and 14*b* of the front wheel assembly 11. Within the present context, when it is stated that a tie rod or a variable length actuator is pivotably coupled between two elements, this means that the ends of the rod or the actuator are coupled to the respective elements in two respective pivots. In the embodiment shown, the tie rods 62*a* and 62*b* are coupled respectively to the upper side and to the lower side of the base 60, and with a degree of overlap between the tie rods, so that the pivoting of the drawbar 55 (together with the base 60) about axis 65 generates a synchronized steering of the wheels of the front wheel assembly 11 in the same direction as the drawbar, as illustrated in FIGS. 5*b* and 5*c*. On the side of the axle 13 opposite the base 60 and the tie rods 62, a hydraulic actuator 66 is furthermore pivotably coupled between a central bracket 67 attached to the axle 13, and a bracket 70 that is uniform with one of the front wheels, wheel 14*a* in the embodiment shown in the drawings. The hydraulic actuator 66 is hydraulically coupled to a second actuator 68 mounted on the rear wheel assembly 12, so as to synchronize the actions of the actuators 66 and 68. The hydraulic coupling is defined as above, i.e. oil pumped out of actuator 66 flows to actuator 68 and vice versa. The second actuator 68 is preferably identical to the first actuator 66, and coupled in the same way as the first actuator, i.e. pivotably coupled between a central bracket 67 and a bracket 70 uniform with wheel 14*a* of the second assembly 12. The rear wheel assembly 12 furthermore has a pair of brackets 63*a* and 63*b*, which are preferably the same in size as the brackets of the front assembly 11, and which are uniform with the respective wheels 14*a* and 14*b* of the rear assembly 12. A single tie rod 69 is pivotably coupled between said brackets 63*a* and 63*b* of the rear assembly 12, so that the tie rod 69 transfers the pivotal position of one rear wheel to the other rear wheel. The hydraulic coupling between the actuators 66 and 68 is configured so that the extension of the first actuator 66 results in the retraction of the second one 68. As seen in FIGS. 5*b* and 5*c*, this results in the respective wheels 14*a* and 14*b* of the two assemblies being steered in opposite directions, thereby enabling the transport of the header 6 along a circular trajectory.

The invention is not limited to the embodiment shown in FIGS. 5*a* to 5*c*. For example, the tie rods 62*a* and 62*b* could be geometrically configured in a manner that allows them to be both coupled to the top side or to the bottom side of the pivotable base 60 instead of one rod being coupled to the top and the other to the bottom. Furthermore, the function of the two tie rods at the front 62*a*/62*b* and the single tie rod at the back 69 may be fulfilled by other arrangements of tie rods. Another embodiment is shown in FIG. 6*a*. Here a tie rod 80 is pivotably coupled between the brackets 63*a* and 63*b* of the wheels of the front assembly 11, while an additional tie rod 81 is pivotably coupled between the right-hand bracket 63*b* and the pivotable base 60. This arrangement will translate the pivoting of the drawbar 55 to the front wheels in the same manner as shown in FIGS. 5*b* and 5*c*. The longer tie rod 80 may pass underneath the pivotable base 60 while the shorter rod 81 is coupled to the top side of the pivotable base 60, but these positions may be reversed or an arrangement may be devised wherein both rods 80 and 81 operate in the same plane relative to the pivotable base 60. Also in the rear wheel assembly 12, alternative tie rod arrangements are possible. As illustrated in FIG. 6*b* for example, the arrangement having two tie rods 62*a*/62*b* at the front may be copied at the rear, by providing an additional pivotable base 82 at the center of the axle 13 of the rear assembly 12, and by providing tie rods 83*a*/83*b* pivotably coupled between this pivotable base 82 and the brackets 63*a*/63*b* of the rear assembly 12 in the same way as for the front assembly. Various combinations of the above-described arrangements are apparent to the skilled person, and are included in the scope of the invention. For example the tie rod arrangement at the front wheel assembly in FIG. 6*a* may be applied at the rear wheel assembly in combination with the same or another tie rod arrangement at the front. It is clear from the above that the synchronization of the actuators 66 and 68 (as also of the actuators 40 and 57) does not necessarily imply that the actuators perform the exact same movement. Synchronization implies that the action of one actuator follows the action of the other, essentially in real time. The actions may be the same, or opposite. For example, the actuator 68 may be coupled between the central bracket 67 and the opposite wheel 14b, instead of the wheel 14a, of the rear wheel assembly 12. In that case, synchronization would imply that the actuator 68 copies the actions of the actuator 66, in order to execute the wheel orientations shown in FIGS. 5b and 5c.

Once again, the actuators 66 and 68 are preferably driven by the hydraulic circuit of the work machine. When the wheel assemblies are in the field mode, the actuators 66 and 68 are depressurized. The wheels 14a and 14b of both wheel assemblies 11 and 12 are thereby free to rotate relative to the axle 13 of the respective wheel assemblies, during a curved trajectory in the field.

In any of the embodiments described above, hydraulic actuators may be replaced by other types of variable length actuators, such as electric actuators. Electric actuators may be synchronized with the same effect of two hydraulic actuators which are hydraulically coupled. This synchronization may be realized by suitably manipulating the electric command signals of the synchronized actuators, so that the action of one actuator follows the action of another (either copying the action, or performing the opposite action).

The invention is related to combine harvesters as well as to other working machines equipped with a detachable header, for example a forage harvester. The invention is related to a detachable header as such according to the invention and to a working machine equipped with such a header.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A self-propelled agricultural working machine comprising:
   a feeder at a front of the machine configured to be moved up or down; and
   a header that is detachably coupled to a front of the feeder, wherein the header comprises:
   a back wall;
   two support and transport wheel assemblies on either side of the feeder, designated as front and rear wheel assemblies, each of the front and rear wheel assemblies comprising an axle and two wheels attached at the two ends of the axle, the wheel assemblies being movable between a field position wherein the axle of each assembly is essentially parallel to a longitudinal direction of the header and a transport position wherein the axle of each assembly is transversal to the longitudinal direction; and
   two actuating systems configured to move respective ones of the wheel assemblies from the field position to the transport position and vice versa, wherein the wheels of the wheel assemblies are pivotable relative to their respective axles and about axes which are transversal to the respective axles, in order to steer the wheel assemblies;
   wherein the front wheel assembly comprises:
   a pivotable base that is pivotably connected to a central location of the axle of the front wheel assembly, the pivotable base being pivotable about an essentially vertical axis, and optionally a deployable drawbar coupled to said pivotable base;
   a first tie rod arrangement configured to transfer the pivotal position of the base to the wheels of the front wheel assembly; and
   a first variable length actuator pivotably coupled to the axle of the front wheel assembly and to one of the wheels of the front wheel assembly;
   wherein the rear wheel assembly comprises:
   a second tie rod arrangement configured to transfer the pivotal position of one rear wheel to the other rear wheel; and
   a second variable length actuator pivotably coupled to the axle of the rear wheel assembly and to one of the wheels of the rear wheel assembly;
   and wherein the operation of the variable length actuators of the front and rear wheel assemblies is synchronized, so as to synchronize the pivotal positions of the wheels of the front and rear wheel assemblies;
   wherein at least one of the actuating systems is configured to move a respective wheel assembly from the field position to the transport position and vice versa, the at least one actuating system comprising:
   a first frame element and a first actuator mechanism coupled between the first frame element and the back wall of the header, wherein the first actuator mechanism is configured to actuate a forward movement of the first frame element from a position behind the back wall of the header to a forward position and vice versa, when the header is lifted up to a given height by the feeder; and
   a second frame element and a second actuator mechanism coupled between the first frame element and the second frame element, wherein the axle of the respective wheel assembly is coupled to the second frame element, and wherein the second actuator mechanism is configured to actuate a swivel movement of the second frame element and thereby of the respective axles and the respective wheels relative to the first frame element when the first frame element is in the forward position, and wherein the swivel movement is configured to bring the respective wheel assembly to or from a position wherein the respective axle is transverse to the longitudinal direction of the header.

2. The working machine according to claim 1, wherein the first tie rod assembly comprises a pair of tie rods pivotably coupled between the respective wheels of the front wheel assembly and the pivotable base.

3. The working machine according to claim 1, wherein the first tie rod assembly comprises:
   a first tie rod pivotably coupled between the wheels of the front wheel assembly in such a way that the first tie rod transfers the pivotal position of one front wheel to the other front wheel; and
   a second tie rod pivotably coupled between one of the wheels of the front wheel assembly and the pivotable base.

4. The working machine according to claim 1, wherein the second tie rod arrangement consists of a single tie rod that is pivotably coupled between the wheels of the rear wheel assembly in such a way that the single tie rod transfers the pivotal position of one rear wheel to the other rear wheel.

5. The working machine according to claim 1, further comprising a second pivotable base pivotably connected to a central location of the axle of the rear wheel assembly, the second pivotable base being pivotable about an essentially vertical axis, and wherein the second tie rod arrangement comprises a pair of tie rods pivotably coupled between the respective wheels of the rear wheel assembly and the second pivotable base.

6. The working machine according to claim 1, further comprising a second pivotable base pivotably connected to a central location of the axle of the rear wheel assembly, the second pivotable base being pivotable about an essentially vertical axis, and wherein the second tie rod assembly comprises:
- a first tie rod pivotably coupled between the wheels of the rear wheel assembly in such a way that the first tie rod transfers the pivotal position of one rear wheel to the other rear wheel; and
- a second tie rod pivotably coupled between one of the wheels of the rear wheel assembly and the second pivotable base.

7. The working machine according to claim 1, wherein the first actuator and the second actuator are synchronized in such a way that the wheels of the rear wheel assembly pivot in a direction opposite to the pivot direction of the wheels of the front wheel assembly.

8. The working machine according to claim 1, wherein the first and second variable length actuators are hydraulic actuators which are hydraulically coupled.

9. The working machine according to claim 1, wherein the axle of the wheel assembly is pivotably suspended from the second frame element so that the axle is freely pivotable relative to the second frame element when the wheel assembly is lifted up from the ground.

10. The working machine according to claim 9, wherein the axle is pivotable relative to the second frame element about a pivot axis that is essentially perpendicular to the axle.

11. The working machine according to claim 1, wherein the axle is coupled to the second frame element in an out-of-center location of the axle.

12. The working machine according to claim 1, wherein the front wheel assembly further comprises a deployable drawbar that is pivotable relative to the pivotable base between an essentially vertical storage position and an essentially horizontal deployed position, the wheel assembly further comprising a drawbar actuator configured to actuate a pivoting movement of the drawbar between said two positions, and wherein the actuator mechanism of the swivel movement and the drawbar actuator are configured so that the pivoting movement of the drawbar is synchronized with the swivel movement of the axle so that the drawbar is brought from the storage position to the deployed position as the wheel assembly swivels towards the transversal position of the axle and vice versa.

13. The working machine according to claim 1, wherein the machine is a combine harvester or a forage harvester.

14. A self-propelled agricultural working machine comprising:
- a feeder at a front of the machine configured to be moved up or down; and
- a header that is detachably coupled to the front of the feeder, the header comprising:
  - a back wall;
  - two support and transport wheel assemblies on either side of the feeder, designated as front and rear wheel assemblies, the front and rear wheel assembly comprising an axle and two wheels attached at the two ends of the axle, the wheel assemblies being movable between a field position wherein the axle is essentially parallel to a longitudinal direction of the header and a transport position wherein the axle is transversal to the longitudinal direction; and
  - two actuating systems, each comprising a first plate, a hook-shaped arm, and a straight arm, the two actuating systems configured to move the wheel assemblies from the field position to the transport position and vice versa, the first plate element of each actuating system operatively coupled to the header back wall by the hook-shaped arm and the straight arm of the each actuating system, wherein the wheels of the wheel assemblies are pivotable relative to their respective axles and about axes which are transversal to the axles, in order to steer the wheel assemblies; and wherein:
  the front wheel assembly comprises:
  - a pivotable base that is pivotably connected to a central location of the axle of the front wheel assembly, the pivotable base being pivotable about an essentially vertical axis, and optionally a deployable drawbar coupled to said pivotable base;
  - a first tie rod arrangement configured to transfer the pivotal position of the base to the wheels of the front wheel assembly; and
  - a first variable length actuator pivotably coupled to the axle of the front wheel assembly and to one of the wheels of the front wheel assembly;
  the rear wheel assembly comprises:
  - a second tie rod arrangement configured to transfer the pivotal position of one rear wheel to the other rear wheel; and
  - a second variable length actuator pivotably coupled to the axle of the rear wheel assembly and to one of the wheels of the rear wheel assembly;
  wherein the operation of the variable length actuators of the front and rear wheel assemblies is synchronized, so as to synchronize the pivotal positions of the wheels of the front and rear wheel assemblies.

\* \* \* \* \*